Aug. 26, 1952      J. P. TREUB      2,608,397

APPARATUS FOR FRACTIONAL DISTILLATION

Filed Sept. 11, 1948

INVENTOR.
Jacobus Petrus Treub
BY
ATTORNEY

Patented Aug. 26, 1952

2,608,397

UNITED STATES PATENT OFFICE 2,608,397

APPARATUS FOR FRACTIONAL DISTILLATION

Jacobus Petrus Treub, Gouda, Netherlands, assignor to N. V. Vereenigde Stearine Kaarsenfabrieken "Gouda-Apollo," Gouda, Netherlands, a corporation of the Netherlands Application September 11, 1948, Serial No. 48,909
In the Netherlands July 28, 1948

1 Claim. (Cl. 261—109)

The invention is concerned with a fractionating column composed of a plurality of trays of the type in which each tray is of such a construction that it allows the vapor and the liquid to traverse the same in substantially parallel flow, in contradistinction to the columns usually employed in which the vapor bubbles through the liquids or flows upwardly in countercurrent with a film of liquid flowing downwardly along a solid surface. The time of contact between the vapor and the liquid in any given tray is considerably shorter than would be necessary for establishing equilibrium.

The present invention has for its object a fractionating column of the first mentioned type comprising a particularly advantageous construction wherein the liquid and the vapor introduced in each of the trays is permitted to remain in contact for a sufficient period of time to establish the equilibrium between said liquid and vapor. The fractionating column according to the invention is composed of a plurality of trays, each of which is provided with vertical partitions so as to form a horizontally closed substantially spiral channel, said channel having at one end a vapor inlet communicating with a chamber between the first mentioned tray and the next higher tray, and at the other end an outlet for both liquid and vapor communicating with a chamber between the first mentioned tray and the next lower tray.

The invention will be illustrated by the accompanying drawing, in which.

Figure 1:
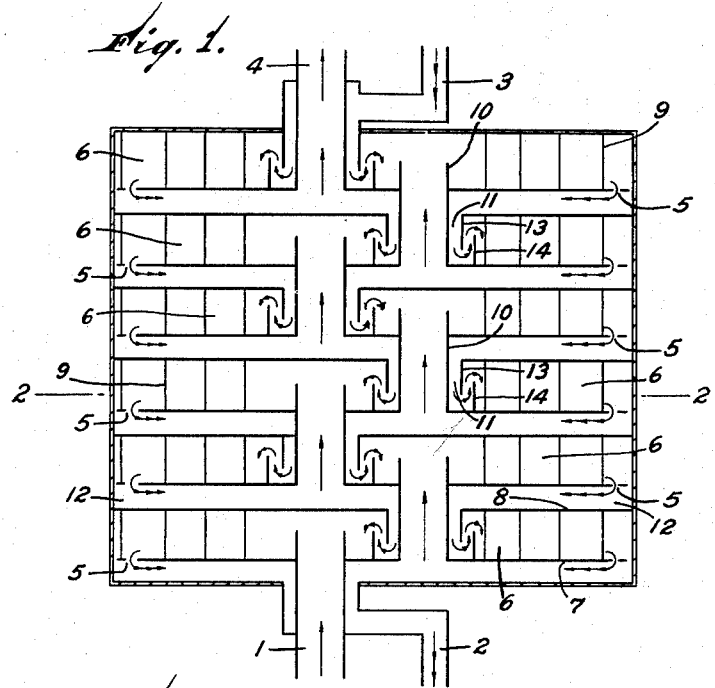
Fig. 1 is a vertical section of a fractionating column, consisting of six trays.
Figure 2:
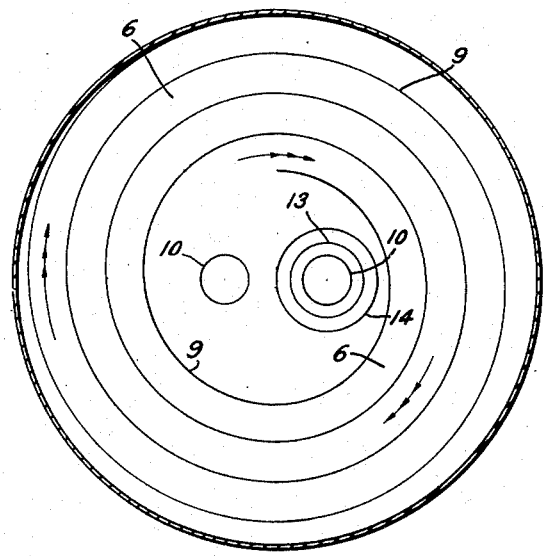
Fig. 2 is a horizontal section of a tray along the line 2—2 of Fig. 1.

Each tray consists of a bottom plate 7, a top plate 8 and a vertical partition 9, which, with the bottom plate and the top plate, forms a closed spiral channel 6. The inlet for the vapor 10 and the inlet for the liquid 11 are in the central part of said spiral channel, whereas the outlet for the mixture of liquid and vapor 5 is arranged at the other part of the spiral channel. The trays are separated by chambers 12 communicating with the said inlets and outlets.

In the drawings the flow vapour is indicated by arrows feathered once, the flow of liquid by arrows feathered twice and the places where a mixture of vapour and liquor is flowing by arrows feathered thrice.

The column is operated as follows:

The vapour from the still enters into the column through the tube 1, whereas vapour leaves the column through the tube 4, from which it flows into a condenser. From this condenser the condensate is refluxed into the column through the tube 3. The liquid from the lowermost element is refluxed into the still through the tube 2.

In each of the elements indicated in the drawing liquid from a condenser or from the next element disposed at a higher level will flow through the liquid seal formed by the circular partitions 13 and 14 which are arranged around the inlet 10 and only extend over a part of the height of the tray. The liquid thus entering the tray and the vapour coming from the next lower tray will flow through the spiral shaped channel in the direction of the thrice feathered arrows and then downwardly through the apertures 5 disposed close to the outer wall of the column to the chamber 12 separating the tray from the next lower tray, or in the case of the last tray from the bottom of the still. Parallel to the said flow of liquid, vapour from a lower element or from the still will move in each element through the spiral-shaped channel 6 and down through the apertures 5. It will subsequently be conducted to the next higher element or to a condenser, as indicated by the arrows feathered thrice and once in the vertical section of the drawing.

The drawing shows the fractionation in the column as a whole in counter-current. Although the said method generally is the most advantageous one, it is not essential in the practice of the invention. Neither is it essential that the vapour be fed to the column exclusively by means of the tube 1; in case of continuous operation the material may be introduced into the column in one or more places at a higher level.

Other modifications are possible within the scope of the invention, e. g. by constructing the elements in such a way that they are thermically more or less insulated from each other and may be separately treated or cooled. It is also possible to provide separate discharge devices in one or more of the elements.

In the claim:

A column for fractional distillation comprising a plurality of horizontal partition members defining a plurality of vertically-spaced horizontally-disposed trays and a horizontally-extending chamber below each tray, a spirally-arranged vertical partition wall defining a closed substantially spiral horizontal channel on each tray, a vapor inlet and a liquid inlet at one end of each of said spiral channels, and an outlet for each tray communicating with the next subjacent chamber, the vapor inlet of each tray comprising a riser extending to the tray, said riser in each tray except the lowermost of said trays extending from the horizontal chamber below the next subjacent tray, the liquid inlet of each tray comprising a conduit extending downwardly and cooperating with a well provided on the tray to form a liquid seal to prevent upward passage of vapor therethrough, the conduit in each except the uppermost of said trays extending from the adjacent chamber above the tray, and said outlet being positioned at a point in the spiral channel remote from the liquid inlet and the vapor inlet whereby the liquid and vapor on each tray are compelled to remain in contact along a substantial portion of the spiral channel in flowing from the vapor inlet and the liquid inlet toward said outlet for discharge into the subjacent chamber.

JACOBUS PETRUS TREUB.

REFERENCES CITED

The following references are of record in the file of this patent:

UNITED STATES PATENTS

| Number | Name | Date |
| --- | --- | --- |
| 1,016,157 | Jost | Jan. 30, 1912 |
| 1,455,930 | Nobis | May 22, 1923 |
| 1,808,088 | Urquhart | June 2, 1931 |
| 2,176,498 | Hickman | Oct. 17, 1939 |
| 2,339,561 | Durrum | Jan. 18, 1944 |
| 2,345,667 | Hachmuth | Apr. 4, 1944 |